May 21, 1929.  A. PETERSON  1,714,442
CULTIVATOR
Filed Dec. 5, 1927   3 Sheets-Sheet 1

Inventor
ALFRED PETERSON
By Frederick E. Bromley
Attorney.

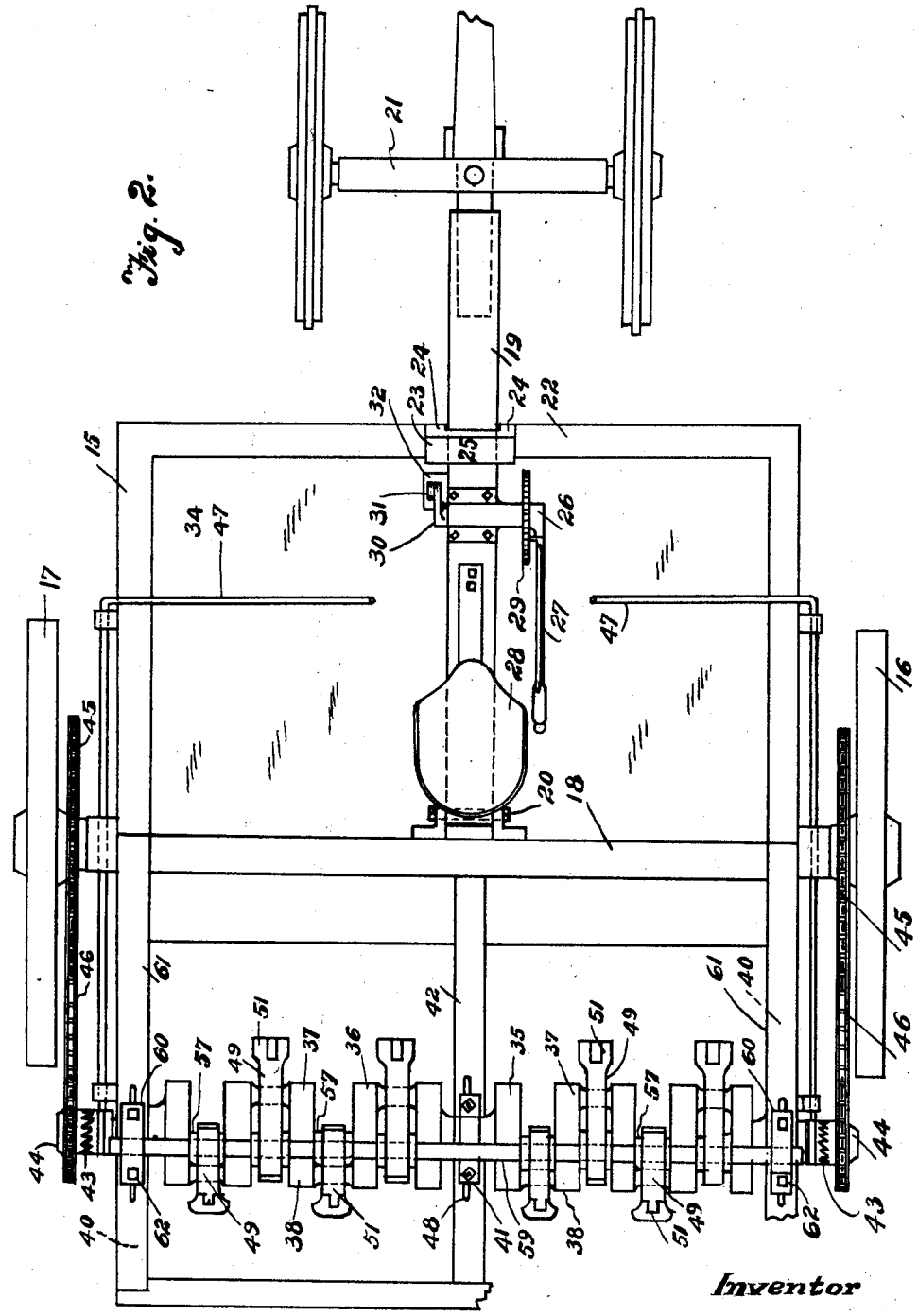

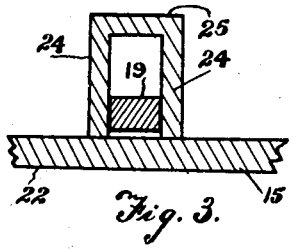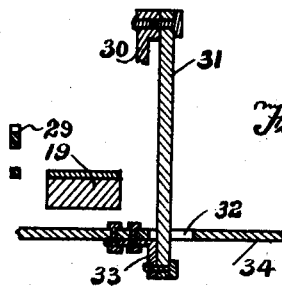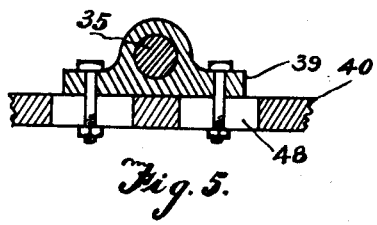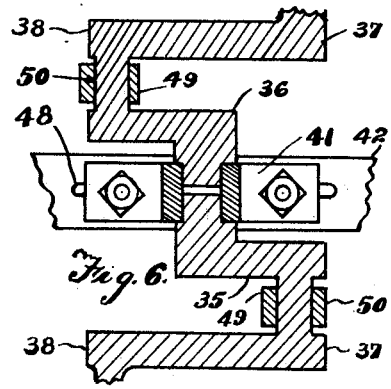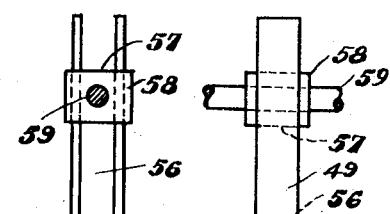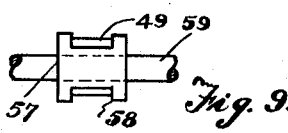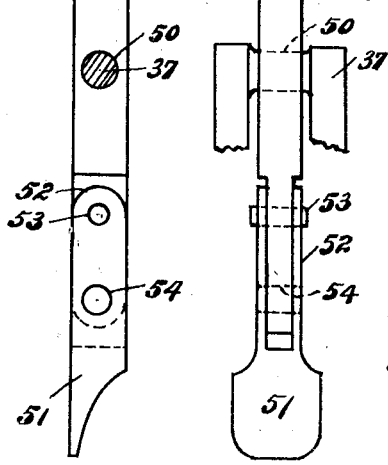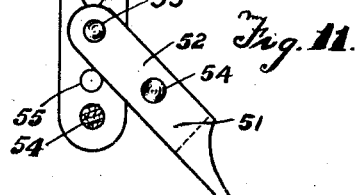

Patented May 21, 1929.

1,714,442

UNITED STATES PATENT OFFICE.

ALFRED PETERSON, OF TOMPKINS, SASKATCHEWAN, CANADA.

CULTIVATOR.

Application filed December 5, 1927, Serial No. 237,761, and in Canada November 15, 1927.

The invention relates to improvements in "cultivators" as described in the present specification and shown in the accompanying drawings which form part of the same.

The invention has for its object the production of a cultivator with movable teeth which are so designed that they operate in a manner simulative of a hoeing action whereby the soil is more thoroughly cultivated and loosened resulting in a more thorough admittance of air to the soil.

In the practical embodiment of the invention herein disclosed the teeth or hoes are carried upon the lower end of substantially vertical bars which operate on cranks of transverse crankshafts. The upper ends of the bars are guided for the purpose of maintaining them and causing them to pass through a constant point in their reciprocation. By this construction of the mechanism the teeth or hoes are caused to describe a somewhat elliptical figure. Upon their downward sweep they penetrate the soil and thoroughly disturb it. The crankshafts are geared to the main road wheels of the cultivator in order to take off power.

A distinctive feature of the teeth mountings is that they are provided with a safety device whereby any tooth will yield upon striking an obstruction such as a stone. This safety device takes the form of a pivotal shank secured in its normal position by a break pin which upon a tooth striking an obstruction is sheared thus permitting the tooth to be thrown back in order that it may pass over the obstruction.

A further distinctive feature resides in the novel construction and arrangement of the tiltable frame of the cultivator by which the teeth may be lowered and raised in order to bring them into and out of working contact with the ground.

Referring to the drawings: Figure 1 is a vertical elevation of the invention.

Figure 2 is a plan view thereof.

Figure 3 is a detail section taken on the line 3—3 of Figure 1.

Figure 4 is a similar section taken on the line 4—4 of the same figure.

Figure 5 is a vertical section through a bearing for the crankshaft illustrating means for adjusting the tension of the chains.

Figure 6 is a fragmentary view in section of the adjacent ends of the crankshafts showing them journaled in a single bearing.

Figure 7 is a detail in side elevation of one of the bars together with its tooth or hoe and the guide for the upper end of the bar.

Figure 8 is a front view of Figure 7 viewed from the rear of the cultivator. This view illustrates the crank for imparting motion to the bar and also a guide for restraining its upper end.

Figure 9 is a plan view of either Figure 7 or Figure 8.

Figure 10 is a detail of a block which forms part of the guide.

Figure 11 is a detail of the lower end of the tooth carrying bar showing the breakpin of the safety device sheared and the tooth thrown clear of an obstruction upon striking same.

Like numerals of reference indicate corresponding parts in each of the figures throughout the drawings.

Figure 1:
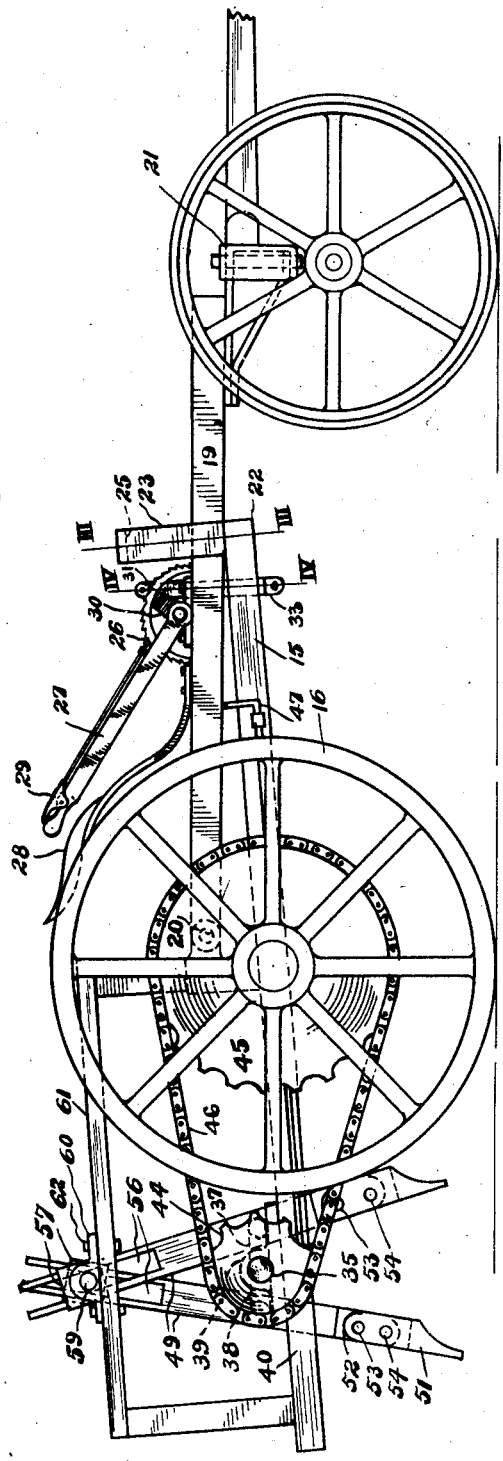

In the drawings, the reference numeral 15 indicates in a general way the main frame which is shown in the drawings as of rectangular shape in plan. The frame is supported upon main road wheels 16 and 17 by means of the axle 18 which axle is positioned approximately intermediate of the length of the frame so that the frame is tiltable about the axle which it utilizes as a fulcrum for tilting purposes in order to lower and raise the rear of the frame which carries the teeth.

19 is a sub-frame which takes the form of a beam pivoted at its rear end to the axle 18 as at 20 and swiveled to the forecarriage 21. This forecarriage is of conventional design.

The front 22 of the main frame is provided with a vertical guide 23 in which the beam 19 operates. This guide consists of a pair of upright members 24, one on each side of the beam 19 and in sliding contact therewith. The top of the members are joined together by a crosspiece 25. This guide functions to take the side thrust and also to limit the up and down movement or tilting of the main frame.

The raising and lowering of the frame is accomplished by means of tilting mechanism 26 comprising a hand lever 27 located adjacent to the seat 28 and carrying a locking device 29 whereby it may be secured in any one of a number of positions. Since this locking device is of conventional construction it requires no detailed description.

The lever 27 is rigidly connected to an arm 30, the outer end of which is pivoted to a rod 31 which extends downwardly through an aperture 32 and connects in a pivotal manner to a bracket 33 that is rigidly fastened to the underside of the frame. By this construction it will be manifest that upon manipulation of the hand lever 27 the main frame can be raised or lowered by the operator in order to bring the teeth into and out of engagement with the ground.

The forepart of the main frame is preferably provided with a platform 34 which is convenient for the driver to stand on; however this is not essential.

Having described the construction and operation of the frame, the teeth and their operating mechanism will now be recounted:

35 and 36 indicate a pair of crankshafts which are aligned and extend transversely of the main frame at the rear end thereof. Each crankshaft has diametrically opposed cranks 37 and 38; see particularly Figure 6. The outer ends of the crankshafts are journalled in bearings 39 which are attached to the longitudinal members 40 of the main frame. The inner ends of the crankshafts are preferably journalled in a single bearing 41 that is attached to a crosspiece 42 of said main frame. The outer ends of the crankshafts project beyond the bearings 39 and are supplied with spiral jaw clutches 43, the driven part of each clutch being connected to a sprocket 44. Each sprocket 44 is connected to a large sprocket 45 by a chain 46 passing therearound. Each sprocket 45 is integral with or secured to the respective road-wheel. By this construction each road-wheel serves to transmit power from the large sprocket to the small one, from where it is transmitted to the respective crankshaft by means of the clutch 43. The clutch will of course be provided with some form of operating means such as lever 47. The clutch shown in the drawings is given by way of example, there being of course many types of clutches which might be equally well employed in this capacity the function being solely to disconnect the crankshafts from the source of power when the operation of the teeth is not required such as when passing from place to place.

To provide for adjustment of the tension of the chains 46 it is suggested that chain tightening means be employed and that shown in the drawings takes the form of slots 48 provided in the members 40 and 42, which slots receive bolts from the bearings 39 and 41 so that the said bearings may be moved to or away from the sprockets 45. These chain tighteners are given by way of example and not of limitation.

49 designates the teeth carrying bars each of which is pivoted to a crank as at 50. The lower end of each bar carries a tooth as at 51, which tooth may be in the form of a hoe or any other form found desirable. In practice it is proposed there shall be teeth of different shapes which may be interchangeable to suit the work to be performed.

Each tooth has a shank 52 which is pivoted at 53 to the lower end of its bar and is rigidly held in its normal position by means of a break-pin 54. This break-pin may be of wood as customary and is inserted in aligned holes in the shank 52 and the lower end of the bar. If desirable the tooth can be adjusted lengthwise of the bar by the provision of a plurality of apertures as at 55 whereby the pivotal connection of the shank may be raised or lowered so that the tooth will extend from the end of the bar for purposes of penetrating the soil to a greater depth. It will be seen that upon the tooth sriking an obstruction the break-pin will be sheared and the tooth raised therefrom by its swinging on the pivotal connection 53 as illustrated in Figure 11.

The upper end of each bar is slotted as at 56 and a block 57 is slidably mounted therein which block has flanges 58 forming lateral thrust shoulders. Each block is mounted on a transverse shaft 59 that extends between the bearings 60 and is secured therein. This construction serves as a guide for each of the bars so that in their reciprocation they pass through the point of intersection of the shaft. With a view to providing means for varying the angularity of the teeth, or in other words "varying their inclination" with respect to the ground, it is proposed that the shaft 59 may be shiftable laterally. This is in the present instance accomplished by slotting the members 61 to which the bearings 60 are attached and fitting bolts 62 through these slots.

In the operation of the invention; as the machine progresses over the ground the gearing transmits motion to the sprockets 44 and when the clutches are thrown in, power is transmitted to the crankshafts which in turn operate the bars and cause their teeth to describe ellipsoidal movements in vertical planes thus simulating a hoeing action. The teeth are brought in and out of engagement with the ground by the manipulation of the lever 27 as theretofore described.

What I claim is:—

In a cultivator, a frame, a crankshaft transversely mounted therein for rotary movement, substantially vertical tooth-carrying bars connected intermediate of their length to said crankshaft, a transverse shaft, blocks swivelly mounted thereon and slidably attached to the upper ends of said bars to confine said upper ends to a reciprocal movement, spaced longitudinal members forming a rigid part of the aforesaid frame, and bearings receiving the transverse shaft, said bearings being adjustably fitted to the said longitudinal members for lengthwise movement in order to vary the inclination of the bars.

Signed at Tompkins, Saskatchewan, Canada, this 22nd day of November, 1927.

ALFRED PETERSON.